(12) United States Patent
Desai et al.

(10) Patent No.: US 11,868,736 B1
(45) Date of Patent: Jan. 9, 2024

(54) APPROACHES TO DERIVING AND SURFACING INSIGHTS INTO CONVERSATIONS IN VIRTUAL ENVIRONMENTS AND SYSTEMS FOR ACCOMPLISHING THE SAME

(71) Applicant: Moonbeam, Inc., Seattle, WA (US)

(72) Inventors: Nirav S. Desai, Seattle, WA (US); Trond Tamaio Nilsen, Seattle, WA (US); Philip Roger Lamb, Christchurch (NZ)

(73) Assignee: Moonbeam, Inc., Seattle, WA (US)

( * ) Notice: Subject to any disclaimer, the term of this patent is extended or adjusted under 35 U.S.C. 154(b) by 0 days.

(21) Appl. No.: 17/984,083

(22) Filed: Nov. 9, 2022

(51) Int. Cl.
| | | |
|---|---|---|
| *G10L 15/183* | (2013.01) | |
| *G06F 40/35* | (2020.01) | |
| *G10L 15/22* | (2006.01) | |
| *G06T 15/00* | (2011.01) | |
| *G06F 40/289* | (2020.01) | |
| *G06T 13/40* | (2011.01) | |
| *G10L 15/18* | (2013.01) | |

(52) U.S. Cl.
CPC ............ *G06F 40/35* (2020.01); *G06F 40/289* (2020.01); *G06T 13/40* (2013.01); *G06T 15/00* (2013.01); *G10L 15/1815* (2013.01); *G10L 15/22* (2013.01)

(58) Field of Classification Search
CPC ....... G06F 40/35; G06F 40/289; G06T 13/40; G06T 15/00; G10L 15/1815; G10L 15/22
See application file for complete search history.

(56) References Cited

U.S. PATENT DOCUMENTS

2023/0108256 A1\* 4/2023 Kaplan .................. G06F 3/011
704/232

FOREIGN PATENT DOCUMENTS

| WO | WO-2022266209 A2 \* | 12/2022 |
| WO | WO-2023059620 A1 \* | 4/2023 |

\* cited by examiner

*Primary Examiner* — Abul K Azad
(74) *Attorney, Agent, or Firm* — Perkins Coie LLP

(57) ABSTRACT

Introduced here is a computer program that is representative of a software-implemented collaboration platform that is designed to facilitate conversations in virtual environments, document those conversations, and analyze those conversations, all in real time. The collaboration platform can include or integrate tools for turning ideas—expressed through voice—into templatized, metadata-rich data structures called "knowledge objects." Discourse throughout a conversation can be converted into a transcription (or simply "transcript"), parsed to identify topical shifts, and then segmented based on the topical shifts. Separately documenting each topic in the form of its own "knowledge object" allows the collaboration platform to not only better catalogue what was discussed in a single ideation session, but also monitor discussion of the same topic over multiple ideation sessions.

18 Claims, 13 Drawing Sheets

500

501
Acquire, via a first computing device associated with a first participant in a conversation, (i) a stream of voice data and (ii) a stream of interactivity data

502
Forward the stream of voice data to an application programming interface for real-time transcription by a transcription service

503
Broadcast the stream of voice data to a second computing device, for presentation to a second participant involved in the converation

504
Receive, from the transcription service, a textual stream that is produced for the stream of voice data

505
Analyze the textual stream in conjunction with the stream of interactivity data, so as to establish the insight into the conversation

506
Cause display of one or more indications of the insight in the virtual environment

FIG. 5

APPROACHES TO DERIVING AND SURFACING INSIGHTS INTO CONVERSATIONS IN VIRTUAL ENVIRONMENTS AND SYSTEMS FOR ACCOMPLISHING THE SAME

TECHNICAL FIELD

Various embodiments concern computer programs and associated computer-implemented techniques for facilitating, documenting, and analyzing conversations that take place over digital media.

BACKGROUND

The term "virtual reality" is commonly used to refer to a simulated experience that can be similar to, or completely different from, the real world. Traditionally, virtual reality computing devices (or simply "VR devices") tend to have display optics that, in operation, are positioned proximate the eyes of users. With these display optics, VR devices can generate realistic digital images (or simple "images"), as well as sounds and other sensations, in an effort to simulate users' presence in a virtual environment. An individual using a VR device may be able to look around the virtual environment, move around the virtual environment, and interact with its content—including virtual representations of other individuals.

Traditionally, VR devices have taken the form of head-mounted display devices (also called "headsets") that are designed to fully immerse users in a virtual environment. A headset normally includes high-resolution display optics that provide separate images for each eye for stereoscopic graphics rendering a virtual environment, an audio system (e.g., that includes one or more audio input mechanisms and/or one or more audio output mechanisms), and a spatial tracking system that monitors positional and rotational movement in real time.

VR devices have been used for decades, most commonly for simulating, designing, and training purposes. Interest in—and development of—VR devices has increased, however, due to growing interest in the "metaverse." Colloquially, this term is used to refer to a network of virtual environments that are focused on social connection. While significant work remains in designing suitable virtual environments and manufacturing suitable VR devices for the metaverse, virtual reality has already become an attractive option for various applications. As an example, meetings in virtual environments can feel more natural than a phone call or video call, especially when those meetings require meaningful interaction between participants.

BRIEF DESCRIPTION OF THE DRAWINGS

FIG. 5 includes a flow diagram of a process for surfacing an insight into a conversation between participants who engage in the conversation in a virtual environment.

Figure 1:
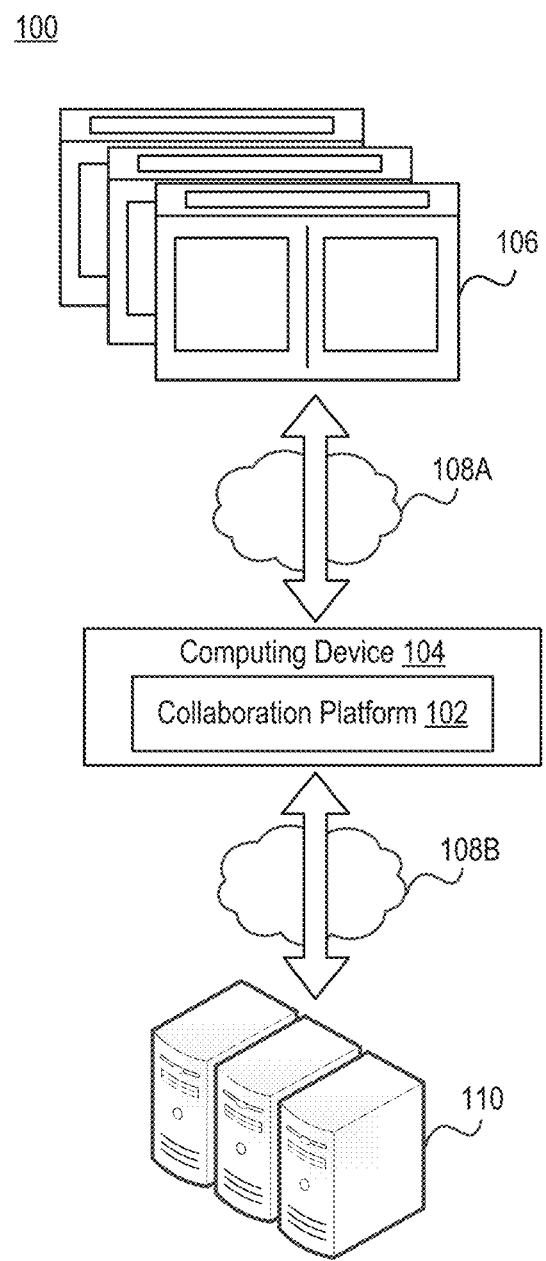
FIG. 1 illustrates a network environment that includes a collaboration platform that is executed by a computing device.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the present disclosure. Accordingly, although specific embodiments are shown in the drawings, the technology is amenable to various modifications.

DETAILED DESCRIPTION

Virtual reality has become an attractive option for various applications. As an example, meetings in virtual environments can feel more natural than a phone call or video call, especially when those meetings require meaningful interaction between participants. Some aspects of virtual meetings are rather straightforward to document. Attendance, for example, can be verified by documenting identifiers that are representative of the participants. Examples of identifiers include name, email address, and the like. Other aspects of virtual meetings are difficult, if not impossible, to document. Consider, for example, the number and variety of topics that may be covered in a "divergent meeting" where participants actively try to broaden the conversation, such as a brainstorming session, designing session, etc. While recordation is an option, identifying each topic—and then properly documenting each topic—can be difficult given the free-flowing and expanding nature of divergent meetings.

Introduced here is a computer program that is representative of a software-implemented collaboration platform (or simply "collaboration platform") that is designed to facilitate conversations in virtual environments, document those conversations, and analyze those conversations, all in real time. As further discussed below, the collaboration platform can include or integrate tools for turning ideas—expressed through voice—into templatized, metadata-rich data structures called "knowledge objects." Discourse throughout a conversation can be converted into a transcription (or simply "transcript"), parsed to identify topical shifts, and then segmented based on the topical shifts. Together, the various topics discussed over the course of a conversation may be called a "topic listing," "topic cloud," or "mind map."

Documenting conversations in this manner provides several notable benefits. First, a participant may be able to "reach into" a topic cloud and then identify a concept that she would like to further elaborate on. Accordingly, concepts may be expanded or extended over time, as additional conversations occur. Second, the collaboration platform can guide a conversation by prompting participants to answer related questions, so as to obtain information related to different aspects of a given concept. As an example, if the conversation is determined to relate to a new company, the collaboration platform may ask the participants whether there are any known competitors. Responses to this query can be further cataloged in the same "knowledge object." And third, the collaboration platform may permit data structures that are representative of documented conversations to be readily stored and exported. As an example, the data structure that is populated with information derived from a conversation may be exportable as an Extensible Markup Language ("XML") file whose contents can be visualized in various data visualization tools.

Documenting conversations in virtual environments in the manner set forth below also provides technical benefits over traditional approaches to documentation or recordation. As an example, documenting the various topics that are discussed over the course of a conversation in the form of "knowledge objects" allows interconnections to be programmatically formed, for example, between related topics. These interconnections not only allow relationships to be more consistently established, but also allow relationships to be surfaced, for example, in response to receiving a query for topics related to a given topic. Simply put, documenting the conversation via interconnected "knowledge objects" leads to more consistency, as the conversation can be represented in the form of a graph data structure as discussed below, and improved searchability (e.g., fewer computational resources consumed, less time taken). Through the approach set forth below, spatial information can also be added to conversational intelligence in a way that adds clarify, for example, in who participants are addressing, the level of engagement of those participants, etc. As an example, information regarding the gaze of participants can be used to improve pronoun understanding. As another information, information regarding the gaze of participants can be used to improve engagement understanding, and therefore which participants may be interested in further conversation on a given topic.

Embodiments may be described in the context of executable instructions for the purpose of illustration. However, those skilled in the art will recognize that aspects of the technology could be implemented via hardware, firmware, or software. As an example, a computer program that is representative of a collaboration platform may be executed by the processor of a computing device. In embodiments where the computing device is a VR device, this computer program may interface, directly or indirectly, with hardware, firmware, or other software implemented on the VR device. For example, this computer program may obtain a stream of values output by a sensor included in, or connected to, the VR devices. Examples of sensors include gyroscopes, accelerometers, magnetometers, ambient light sensors, temperature sensors, eye-tracking sensors (also called "eye trackers" or "gaze trackers"), and the like. In embodiments where the computing device is communicatively connected to a VR device, this computer program may indirectly interface with hardware, firmware, or software implemented on the VR device.

Terminology

References in the present disclosure to "an embodiment" or "some embodiments" mean that the feature, function, structure, or characteristic being described is included in at least one embodiment. Occurrences of such phrases do not necessarily refer to the same embodiment, nor do they necessarily refer to alternative embodiments that are mutually exclusive of one another.

The term "based on" is to be construed in an inclusive sense rather than an exclusive sense. That is, in the sense of "including but not limited to." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, logical, or a combination thereof. For example, elements may be electrically or communicatively connected to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing multiple tasks.

When used in reference to a list of multiple items, the word "or" is intended to cover all of the following interpretations: any of the items in the list, all of the items in the list, and any combination of items in the list.

Overview of Collaboration Platform

FIG. 1 illustrates a network environment 100 that includes a collaboration platform 102 that is executed by a computing device 104. An individual (also referred to a "user") can interact with the collaboration platform 102 via interfaces 106. For example, a user can access an interface through which information derived from, or related to, a conversation in a virtual environment. As another example, a user can access an interface through which analyses of a conversation in a virtual environment can be viewed.

As shown in FIG. 1, the collaboration platform 102 can reside in a network environment 100. Thus, the computing device 104 on which the collaboration platform 102 resides can be connected to one or more networks 108A-B. Depending on its nature, the computing device 104 could be connected to a personal area network (PAN), local area network (LAN), wide area network (WAN), metropolitan area network (MAN), or cellular network. For example, if the computing device 104 is a computer server, then the computing device 104 may be accessible to users via respective VR devices that are connected to the Internet via LANs.

The interfaces 106 can be accessed via a web browser, desktop application, mobile application, or another form of computer program. For example, information related to a conversation that is acquired, generated, or otherwise obtained by the collaboration platform 102 could be presented to participants via respective VR devices as further discussed below. Said another way, the collaboration platform 102 can transmit the information to each VR device for display to the corresponding participant. As another example, an individual can initiate a web browser and then navigate to a web address that is associated with the collaboration platform 102 to view analyses of a conversation, or an individual can access, via a desktop application, interfaces 106 that are generated by the collaboration platform 102 to view analyses of a conversation. Note that the individual could be a participant in the conversation or another person. Accordingly, interfaces generated by the collaboration platform 102 may not only be accessible on VR devices via which participants engage in conversation in a virtual environment, but also mobile phones, tablet computers, desktop computers, and the like.

Generally, the collaboration platform 102 is executed by a cloud computing service operated by, for example, Amazon Web Services®, Google Cloud Platform™, or Microsoft Azure®. Thus, the computing device 104 may be representative of a computer server that is part of a server system 110. Often, the server system 110 is comprised of multiple computer servers. These computer servers can include different types of data (e.g., information regarding participants, such as name, demographic information, credentials, etc.), algorithms for processing incoming data from VR devices, and other assets. Those skilled in the art will recognize that this data could also be distributed among the server system 110 and computing devices. As an example, data can initially be processed by the VR device on which it originates (e.g., to obfuscate or filter sensitive information) before being transmitted to the server system 110 for further processing.

As mentioned above, aspects of the collaboration platform 102 could be hosted locally, for example, in the form of a computer program that is executed by the VR device used by a participant to engage in conversation. Thus, aspects of the collaboration platform 102 could be hosted on the VR devices used by participants to engage in conversation, a server system 110 to which the VR devices are communicatively connected, or a combination thereof.

Figure 2:
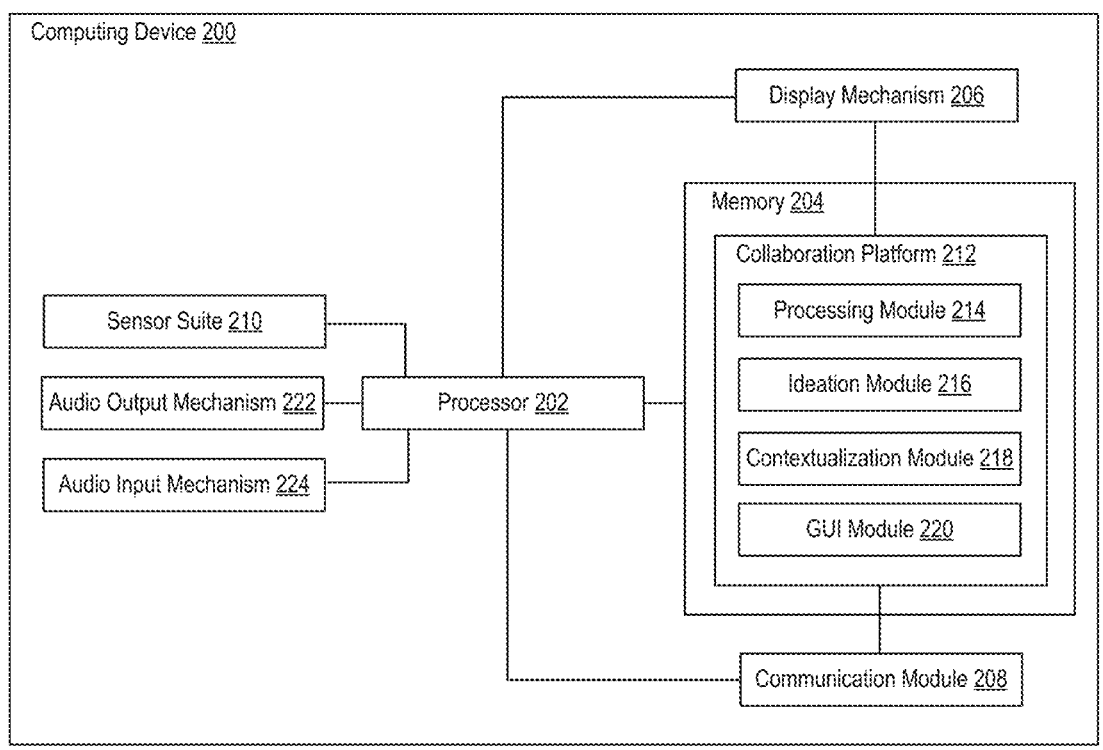
FIG. 2 illustrates an example of a computing device that is able to implement a collaboration platform designed to document conversations that occur between participants in virtual environments.

FIG. 2 illustrates an example of a computing device 200 that is able to implement a collaboration platform 212 designed to document conversations that occur between participants in virtual environments. As shown in FIG. 2, the computing device 200 can include a processor 202, memory 204, display mechanism 206, communication module 208 and sensor suite 210. Each of these components is discussed in greater detail below.

Those skilled in the art will recognize that different combinations of these components may be present depending on the nature of the computing device 200. For example, if the computing device 200 is a computer server that is part of a server system (e.g., server system 110 of FIG. 1), then the computing device 200 may not include the display mechanism 206 or sensor suite 210. Conversely, if the computing device 200 is a VR device, then the computing device 200 can include the display mechanism 206 and sensor suite 210.

The processor 202 can have generic characteristics similar to general-purpose processors, or the processor 202 may be an application-specific integrated circuit ("ASIC") that provides control functions to the computing device 200. As shown in FIG. 2, the processor 202 can be coupled to all components of the computing device 200, either directly or indirectly, for communication purposes.

The memory 204 can be comprised of any suitable type of storage medium, such as static random-access memory ("SRAM"), dynamic random-access memory ("DRAM"), electrically erasable programmable read-only memory ("EEPROM"), flash memory, or registers. In addition to storing instructions that can be executed by the processor 202, the memory 204 can also store data generated by the processor 202 (e.g., when executing the modules of the collaboration platform 212). Note that the memory 204 is merely an abstract representation of a storage environment. The memory 204 could be comprised of actual integrated circuits (also called "chips").

The display mechanism 206 can be any mechanism that is operable to visually convey information to a user. For example, the display mechanism 206 can be a panel that includes light-emitting diodes ("LEDs"), organic LEDs, liquid crystal elements, or electrophoretic elements. As further discussed below, outputs produced by the collaboration module 212 (e.g., through execution of its modules) can be posted to the display mechanism 206 for review.

The communication module 208 may be responsible for managing communications external to the computing device 200. The communication module 208 can be wireless communication circuitry that is able to establish wireless communication channels with other computing devices. Examples of wireless communication circuitry include 2.4 gigahertz ("GHz") and 5 GHz chipsets compatible with Institute of Electrical and Electronics Engineers ("IEEE") 802.11—also referred to as "Wi-Fi chipsets." Alternatively, the communication module 208 may be representative of a chipset configured for Bluetooth®, Near Field Communication ("NFC"), and the like. Some computing devices—like mobile phones, tablet computers, and the like—are able to wirelessly communicate via separate channels, while other computing devices—like VR devices and augmented reality computing devices (or simply "AR devices")—tend to wirelessly communicate via a single channel. Accordingly, the communication module 208 may be one of multiple communication modules implemented in the computing device 200, or the communication module 208 may be the only communication module implemented in the computing device 200.

The nature, number, and type of communication channels established by the computing device 200—and more specifically, the communication module 208—can depend on (i) the sources from which data is received by the collaboration platform 212 and (ii) the destinations to which data is transmitted by the collaboration platform 212. Assume, for example, that the collaboration platform 212 resides on a computer server of a server system (e.g., server system 110 of FIG. 1). In such embodiments, the communication module 208 can communicate with VR devices from which to obtain data. As further discussed below, the data obtained from each VR device could include (i) voice data that includes words spoken by a corresponding participant as part of a conversation and/or (ii) interactivity data that specifies spatial interactions of the corresponding participant with attributes of the virtual environment.

Sensors can be implemented in the computing device 200 if, for example, the computing device 200 is the VR device used by a participant to engage in conversation. Collectively, these sensors can be referred to as the "sensor suite" 210 of the computing device 200. For example, the computing device 200 can include a motion sensor whose output is indicative of motion of the computing device 200 as a whole. Examples of motion sensors include multi-axis accelerometers and gyroscopes. Other examples of sensors include magnetometers, ambient light sensors, temperature sensors, gaze trackers, and the like.

If the computing device 200 is the VR device used by a participant to engage in conversation, then the computing device 200 can include an audio output mechanism 222 and/or audio input mechanism 224. The audio output mechanism 222 can be any apparatus that is able to convert electrical impulses into sound. One example of an audio output mechanism is a loudspeaker (or simply "speaker"). Another example of an audio output mechanism is a physical port or module to which headphones can be connected. Meanwhile, the audio input mechanism 224 can be any apparatus that is able to convert sound into electrical impulses. One example of an audio input mechanism is a microphone. Together, the audio output and input mechanisms 222, 224 can enable the user to engage in conversation as a participant. Over the course of a conversation, the audio input mechanism 224 can convert sound into electrical impulses that collectively form a signal that is representative of voice data. This voice data can be locally examined by the collaboration platform 212, or this voice data can be transmitted, by the communication module 208, to a destination external to the computing device 200 for further analysis.

For convenience, the collaboration platform 212 is referred to as a computer program that resides within the memory 204. However, the collaboration platform 212 could be comprised of software, firmware, or hardware that is implemented in, or accessible to, the computing device 200. In accordance with embodiments described herein, the collaboration platform 212 can include a processing module 214, ideation module 216, contextualization module 218, and graphical user interface (GUI) module 220. Each of these modules can be an integral part of the collaboration platform 212. Alternatively, these modules can be logically separate from the collaboration platform 212 but operate "alongside" it. Together, these modules enable the collaboration platform 212 to turn ideas, expressed through voice as part of a conversation, into templatized, metadata-rich data structures called "knowledge objects."

The processing module 214 can process data obtained by the collaboration platform 212 into a format that is suitable for the other modules. For example, the processing module 214 can apply operations to voice data that is generated by the audio input mechanism 224 over the course of a conversation, in preparation for analysis by the other modules of the collaboration platform 212. Thus, the processing module 214 can filter or alter the voice data, such that the voice data can be more readily analyzed. As another example, the processing module 214 can apply operations to interactivity data that is generated by the sensor suite 210 or another component (e.g., one or more controllers that serve as input devices for the computing device 200) in preparation for analysis by the other modules of the collaboration platform 212. As further discussed below, the interactivity data can indicate spatial interactions of a user of the computing device 200 with the virtual environment. Moreover, the processing module 214 may be responsible for temporally aligning or associating the voice data with the interactivity data, such that insight can be gained into the spatial interactions of the user while she is speaking or listening.

The ideation module 216 may be responsible for turning ideas—expressed through voice—into templatized, metadata-rich data structures called "knowledge objects." As further discussed below, discourse throughout a conversation can be converted into a transcript, parsed to identify topical shifts, and then segmented based on the topical shifts. Information extracted or derived from each segment of the transcript can be populated into a data structure.

In some embodiments, the ideation module 216 programmatically associates the data structures associated with a given conversation to produce a "topic cloud" that is representative of a graph data structure. Documenting conversations in this manner provides several notable benefits. First, participants can "reach into" the topic cloud and then identify a concept to be further elaborated on. Accordingly, concepts can be expanded or extended over time, as additional conversations occur. Second, the ideation module 216 can act as a guided agent by posing questions that are intended to provoke further discussion or disclosure. When acting as a guided agent, the ideation module 216 can integrate aspects of conversational artificial intelligence, spatial computing, and context-relevant metadata as further discussed below, so as to gain insights into the conversation being guided. And third, the ideation module 216 can permit data structures that are representative of documented conversations to be readily stored and exported. As an example, the data structure that is populated with information derived from a conversation may be exportable as an XML file whose contents can be visualized in various data visualization tools.

In combination with the GUI module 220, the ideation module 216 can provide interfaces to help participants use their voices to structure their thoughts through conversation into "knowledge objects." To accomplish this, the ideation module 216 can employ (i) a library of guided processes that are learned or developed for facilitating conversation, (ii) a systematic approach to creating "knowledge objects," and (iii) a systematic approach to connect "knowledge objects." Each of these is discussed in greater detail below.

As participants collaborate on ideas in a virtual environment, the collaboration platform 212 can obtain streams of voice data and streams of interactivity data from the VR devices associated with those participants. The contextualization module 218 may be responsible for identifying behavioral factors of the meeting and then storing these behavioral factors as metadata. Examples of behavioral factors include attention, emphasis, sentiment, focus, posture, and the like. These behavioral factors can be identified, inferred, or otherwise determined through analysis of the interactivity data in combination with the voice data.

Such an approach to documenting the meeting allows more context to be added, making the data structures associated with the meeting "read" much like a script. For example, if a first person (Person A) responds to a question from a second person (Person B), the contextualization module 218 can add metadata to the data structure corresponding to that segment of the meeting that allows for insights such as "Person A responded in an eager and thoughtful manner using polite but measured language," "Person A responded in a dismissive manner and her focus appeared to be elsewhere," or "Person A responded in a thoughtful manner but her gaze was focused on Person C, indicating that she may have been looking for confirmation of her response."

Employing behavioral analytics on participants in a virtual meeting may be helpful in suggesting questions to facilitate conversation in an automated manner; however, employing behavioral analytics may also be helpful in documenting context and outcomes, as well as adjusting the virtual environment as necessary (e.g., to enhance productivity, increase comfortability, etc.). To accomplish this, the contextualization module 218 can collect, compute, or derive metrics in order to establish behavior, for example, in terms of attention and focus. Collectively, these metrics characterize the nature of the conversation and context in which concepts are introduced and discussed. For example, these metrics can be used to establish factors such as importance, balance, and interest, which might otherwise be difficult, if not impossible, to establish. Metrics that can be used by the contextualization module 218 include head position, head orientation, left hand position, left hand orientation, right hand position, right hand orientation, gaze angle, voice tone, and biological signals such as heart rate, respiratory rate, blinking rate, blood pressure, galvanic skin response, and brain electrical activity. Note that the term "pose" can be used to collectively refer to the combination of position and orientation. Therefore, the head position and orientation may be referred to as the "head pose," the left hand position and orientation may be referred to as "left hand pose," and the right hand position and orientation may be referred to as "right hand pose."

The GUI module 220 may be responsible for generating entire interfaces that can be presented by the display mechanism 206 or forwarded to the communication module 208 for transmittal to another computing device. Additionally or alternatively, the GUI module 220 can be responsible for generating digital elements that are overlaid on interfaces generated by another computer program. Regardless of its form, information that is calculated, derived, or otherwise obtained by the ideation module 216 and/or contextualization module 218 for a conversation can be presented to participants in the conversation.

Figure 3:
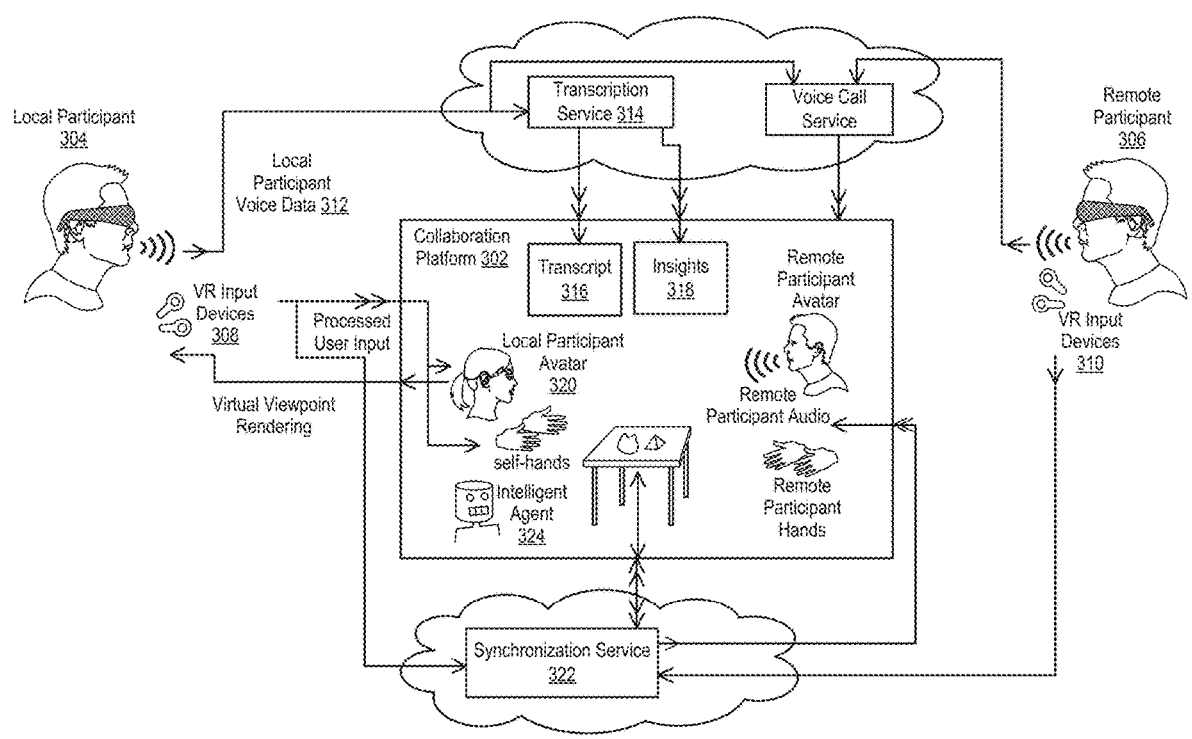
FIG. 3 includes a schematic diagram that illustrates how a collaboration platform can gain insights into conversation between a first participant and a second participant.

FIG. 3 includes a schematic diagram that illustrates how a collaboration platform 302 can gain insights into conversation between a first participant 304 (also called a "local participant" or "local user") and a second participant 306 (also called a "remote participant" or "remote user"). The first and second participants 304, 306 can engage in conversation in a virtual environment via respective computing devices.

In FIG. 3, these computing devices are illustrated as VR devices that are worn on the head and controlled via respective VR input devices 308, 310. The VR input devices 308, 310 can be controllers that are designed for manipulation by the hands and fingers. Note that the first and second participants 304, 306 could engage in conversation via respective AR devices or extended reality computing devices (or simply "ER devices") instead of VR devices. The first and second participants 304, 306 could also engage in conversation via another type of computing device altogether. For example, the first and second participants 304, 306 can engage in conversation via respective mobile phones, tablet computers, or laptop computers. Accordingly, while embodiments may be described in the context of VR devices, the features of those embodiments may be similarly applicable to embodiments in which the participants converse via another type of computing device.

For the purpose of illustration, the following processes are discussed with reference to the local participant 304. Therefore, only data being received from the remote participant 306 is shown in FIG. 3; data being transmitted to the remote participant 306 are not shown, but are shown for the local participant 304. Those skilled in the art will recognize that a conversation could include any number of participants, though only two participants are shown in FIG. 3.

To engage in conversation, the local participant 304 can interact with a corresponding VR device and VR input devices 308 to engage with a virtual environment in which the local participant 304 and other participants (e.g., the remote participant 306) are represented. Through the corresponding VR device, the local participant 304 can interact with an immersive presentation of the virtual environment. In embodiments where the local participant 304 utilizes another type of computing device, the local participant 304 can interact with an on-display representation of the virtual environment in a similar fashion, albeit with actions mediated by, for example, a pointing device (e.g., a computer mouse) and keyboard rather than VR input devices 308.

As the local participant 304 engages in conversation, the corresponding VR device will generate a stream of voice data 312. At a high level, the stream of voice data 312 includes words spoken by the local participant 304 as part of the conversation. In some embodiments, the stream of voice data 312 is transmitted to the collaboration platform 302, which can in turn transmit the stream of voice data 312 to a transcription service 314 that engages in AI-assisted semantic processing of the stream of voice data 312. For example, the collaboration platform 302 can forward the stream of voice data 312—in its raw form or processed form—to an application programming interface ("API") for real-time transcription by the transcription service 314. One example of a transcription service is Symbl.ai, a conversation intelligence platform that provides an API for access by computer programs such as the collaboration platform. Concurrently, the collaboration platform 302 can broadcast the stream of voice data 312 to the virtual devices of other participants—including the VR device of the remote participant 306—while also receiving streams of voice data from these other participants. In other embodiments, the stream of voice data 312 is directly transmitted to the transcription service 314.

Thus, the transcription service 314 can be accessed by the collaboration platform 302 and/or VR devices of participants engaged in the conversation. Regardless of its deployment, the transcription service 314 can receive separate streams of voice data for the participants engaged in the conversation, and the transcription service 314 can examine these separate streams of voice to obtain or produce a spatialized audio rendering of each participant's voice. The transcription service 314 can produce, as output, a transcript 316, as well as additional semantic analysis items such as insights 318 and summaries. In embodiments where transcription is performed by the transcription service 314 in real time, the output can be in the form of a textual stream.

In some embodiments, additional data related to the head pose, left hand pose, right hand pose, gaze angle, gestures, and engagement activities (e.g., with the buttons of the VR input devices 308, 310) are obtained by the collaboration platform 302. Some of these data can be received directly from a source (e.g., the VR device or its VR input devices), while other of these data can be computed or inferred by the collaboration platform 302, for example, based on data generated by the VR device or its VR input devices. Regardless of how it originates, this additional data can be referred to as "processed user input." The collaboration platform 302 can use the processed user input to control the pose of an avatar 320 in the virtual environment that corresponds to the local participant 304. Normally, the avatar 320 is an anthropomorphic representation of the local participant 304, though the avatar 320 need not always have human characteristics. The avatar 320 is simply meant to be a digital representation of the local participant 304. Synchronization of the avatar 320 with the local participant 304 in terms of head pose, left hand pose, right hand pose, gaze angle, and actions taken with respect to objects in the virtual element can be made by the collaboration platform via a synchronization service 322. The synchronization service 322 can perform discrete-time simulation of physical properties of objects in the virtual environment, and then broadcast changes to participants (and more specifically, the VR devices of those participants) as necessary. The VR devices of those participants can in turn render representations of the altered objects in each participant's instance of the virtual environment.

As mentioned above, the collaboration platform 302 can implement an intelligent agent 324 in some embodiments. Said another way, an intelligent agent 324 can act as a participant in the conversation in some embodiments. In such embodiments, the intelligent agent 324 can be represented by an avatar.

Figure 4:
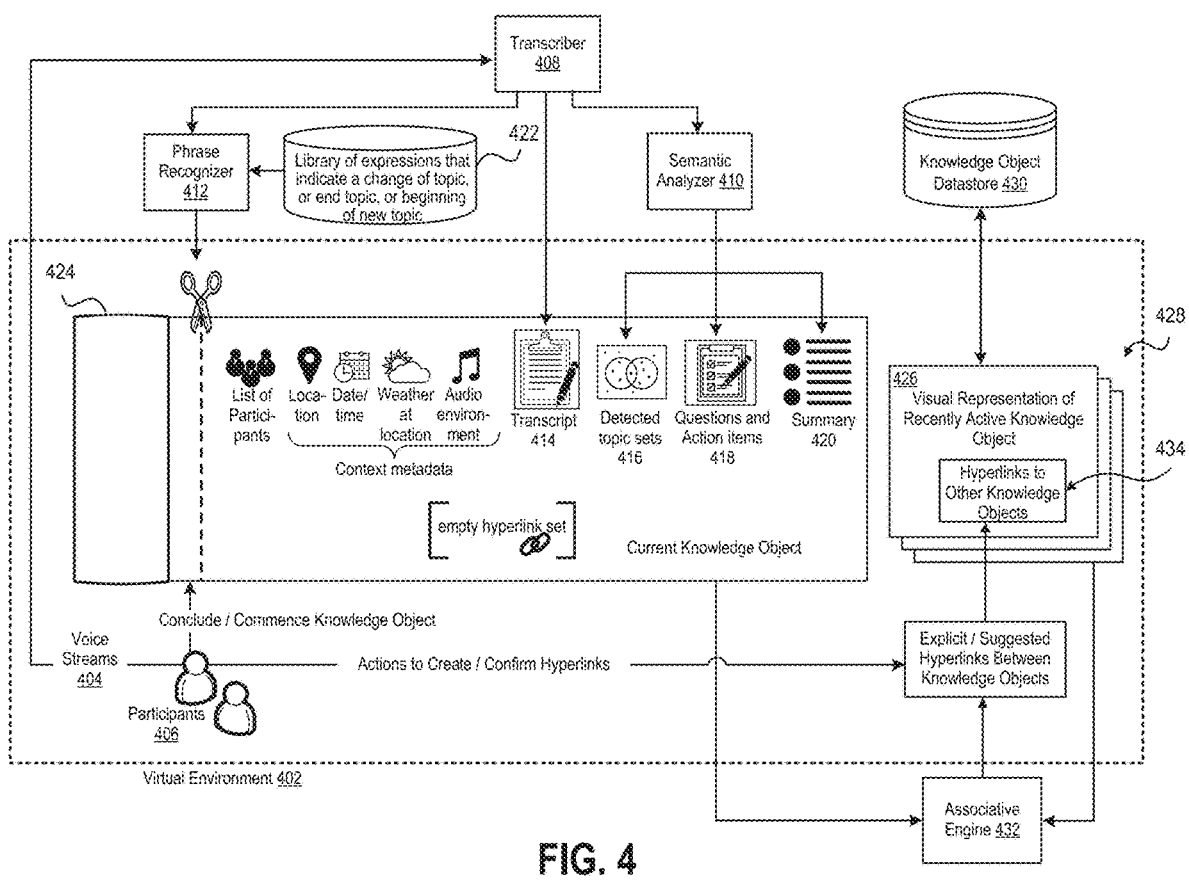
FIG. 4 includes a functional block diagram illustrating how a data structure called a "knowledge object" can be created in accordance with an ideation framework.

FIG. 4 includes a functional block diagram illustrating how a data structure called a "knowledge object" can be created in accordance with an ideation framework. The ideation framework can be implemented by an ideation module (e.g., ideation module 216 of FIG. 2) that is part of a collaboration platform.

In FIG. 4, the virtual environment 402 described above with reference to FIG. 3 is represented by the dashed box. Each item shown inside the dashed box can be digitally represented inside the virtual environment 402, which participants in a conversation can interact with. For example, a participant can point to a digital representation, move a digital representation, or edit a digital representation using her voice, gestures, or other input (e.g., provided via buttons of the VR device). Items shown outside the dashed box represent processes that can be performed by a collaboration platform that, as discussed above, could be implemented on a computing device (e.g., a VR device) that is local to the participant or a network-accessible server system. Connecting lines represent dataflows, while arrowheads indicate the direction of each dataflow.

One key dataflow is the streams of voice data 404 from participants 406. As shown in FIG. 4, these streams of voice data 402 can be processed by a transcription module 408 (also called a "transcriber"), a semantic analysis module 410 (also called a "semantic analyzer"), and a phrase recognition module 412 (also called a "phrase recognizer").

The transcriber 408 may be responsible for performing a speech-to-text operation on the streams of voice data 404 to produce streams of text and then generating a syntactically correct transcript 414 by combining the streams of text. In some embodiments, a transcription service is responsible for transcribing the streams of voice data 404 as discussed above, and in such embodiments, the collaboration platform may not include the transcriber 408. Instead, the collaboration platform can rely entirely on the transcription service for transcription.

The semantic analyzer 410 may be responsible for inferring semantically correct structure and creating sets of sentences 416 (also called "topic sets") that are determined to relate to similar topics. Moreover, the semantic analyzer 410 may produce insights, such as questions and action items 418, and summaries 420 of extended speeches. Semantic analysis could also be performed by the transcription service—or some other service—and therefore, the collaboration platform may not include the semantic analyzer 410 in some embodiments. In embodiments where the collaboration platform does not include a semantic analyzer 410, the collaboration platform may obtain (e.g., from the transcription service or another service) the topic sets 416, insights, and summaries 420.

The phrase recognizer 412 may be responsible for determining, based on a comparison of the transcript 414 to a pre-supplied library 422 of phrases that indicate a beginning, ending, or changing of topic. Said another way, the phrase recognizer 412 can draw upon the pre-supplied library 422 to establish when a phrase contained therein (or a semantic equivalent) has been uttered by one of the participants in the conversation. The process for establishing topical shifts is discussed in greater detail below.

During a conversation, the participants 406 will speak and perform actions in the virtual environment 402. These actions can be documented and recorded by the collaboration platform on a continuous "scrolling tape" 424 that is representative of a "current knowledge object." The term "current knowledge object" can be used to refer to a knowledge object that is currently in an active editing state. The term "past knowledge object" can be used to refer to a knowledge object that was previously in an active editing state and is currently in a locked state with data stored therein, while the term "future knowledge object" can be used to refer to a knowledge object that has yet to be in an active editing state and is currently largely or entirely devoid of data. As further discussed below, the collaboration platform can record content of the conversation and contextual metadata related to the conversation into the current knowledge object. For example, the current knowledge object can include:

A list of participants who are engaged in the conversation or who have contributed to the corresponding topic;

Outputs from processing of the voice data 404, such as the transcript 414, topic sets 416, insights such as questions and action items 418, and summary 420; and Contextual metadata such as the geographical location of each participant, the local date and time of each participant, the weather conditions experienced by each participant, and the audio environment (e.g., background music, noise levels, etc.) experienced by each participant.

As data accumulates on the scrolling tape 424, the participants 406 can perform an action to "cut" the scrolling tape 424. Said another way, the participants 406 may be permitted to expressly indicate that the data recorded in the current knowledge object should be separated into a discrete knowledge object. Visually, the scrolling tape 424 can be "cut off" to form a card 426 in a "stack" 428 that is visually represented as contained in a box, for example. Accordingly, as the conversation proceeds, the participants 406 can indicate when the scrolling tape 424 should be "cut off" to form cards—each of which corresponds to a different topic—that collectively define a stack 428. That is, the stack 428 can be representative of a collection of cards, each of which is representative of a knowledge object. This stack 428 documents the various topics that were discussed over the course of the conversation, and because each topic is represented using a card, the participants 406 can readily recall what was discussed, whether any topics warrant further discussion, etc. In FIG. 4, the most recent card 426 is labelled as "recently active knowledge object."

Generally, the action to conclude the current knowledge object and commence recordation of a new knowledge object—visually represented as cutting a card 426 from the rolling scroll 424 and adding the card 426 to the stack 428—can be made through autonomous action by the collaboration platform or through direct user action by one of the participants 406. Referring to the former, the phrase recognizer 412 can employ artificial intelligence and semantic analysis to discover a phrase that indicates a participant 406 wishes to delineate the end of the current knowledge object from the beginning of the next knowledge object. For example, the participant can utter "Let's move on to the next topic," and when this phrase—or a semantically identical or comparable phrase—is detected, the phrase recognizer 412 ma can y "cut" the rolling scroll 424 so that the current knowledge object is finalized and its card is added to the stack 428. Referring to the latter, the phrase recognizer 412 can employ a matching algorithm to discover that a participant uttered a phrase (e.g., "conclude current knowledge object" or "save current knowledge object") or provided other input (e.g., interacted with a graphical element in the virtual environment 402) to directly indicate that the current knowledge object should be concluded.

Note that the stack 428 of recently active knowledge objects can be a visual representation of a portion of a larger datastore 430 of knowledge objects created during other meetings in the virtual environment 402. This datastore 430 of knowledge objects could be maintained in a local monolithic database, or this datastore 430 of knowledge objects could be maintained in a distributed database.

In some embodiments, the collaboration platform also includes an associative engine 432 that is implemented by a contextualization module (e.g., contextualization module 218 of FIG. 2). The associative engine 432 can be an AI-powered system that is configured to continuously detect semantic and contextual linkages between knowledge objects, including the current knowledge object and knowledge objects in the stack 428 or datastore 430. When a potential linkage between a pair of knowledge objects is detected (e.g., a pair of knowledge objects with a similar set of participants, or a pair of knowledge objects generated under the same weather conditions), then the collaboration platform can display the potential linkage and allow the participants 406 to either dismiss or confirm the potential linkage. If the potential linkage is confirmed, the associative engine 432 can write hyperlinks into the hyperlink set 434 of each relevant knowledge object. Note that the hyperlink set 434 could indicate linkages through artifacts other than hyperlinks. For example, hyperlink set 434 could include Quick Response ("QR") codes, barcodes, machine-readable codes (e.g., alphanumeric codes), or human-readable codes instead of, or in addition to, hyperlinks. Thus, the hyperlink set 434 could include any form of artifact that can be used to digitally identify other knowledge objects. While appropriate linkages can primarily be determined through automated analysis by the associative engine 432, the participants 406 can also be permitted to define linkages. Assume, for example, that the associative engine 432 receives input indicative of a selection of cards representing two or more knowledge objects in the virtual environment 402. This manual linkage request can be based on any piece of information present in at least one of the selected cards. In such a scenario, the associative engine 432 can write hyperlinks into the hyperlink sets of the selected cards as discussed above.

Methodologies for Deriving and Surfacing Insights into Virtual Conversations

FIG. 5 includes a flow diagram of a process 500 for surfacing an insight into a conversation between participants who engage in the conversation in a virtual environment. As mentioned above, the participants can interact with the virtual environment using respective VR devices, AR devices, ER devices, mobile phones, tablet computers, laptop computers, or another type of computing device.

Initially, a collaboration platform can acquire, via a first computing device, (i) a stream of voice data that includes words spoken by a first participant as part of the conversation and (ii) a stream of interactivity data that includes a set of spatial interactions of the first participant with one or more attributes of the virtual environment (step 501). In the event that the first participant utilizes a VR device, the stream of voice data is generally sourced from an audio input mechanism on the VR device. In the event that the first participant utilizes another type of computing device, the stream of voice data can be generated by an external accessory (e.g., a webcam or headset) that is communicatively connected to the computing device or the computing device itself. As mentioned above, the stream of interactivity data can include a set of spatial interactions of the first participant with attributes of the virtual environment. Moreover, the interactivity data can specify engagement activities of the first participant (e.g., with the buttons of the first computing device). At a high level, the interactivity data can indicate how the first participant intends to interact with the virtual environment—including its objects and avatars that represent other participants. For example, the interactivity data can include a temporal series of values for head pose, left hand pose, right hand pose, gaze angle, virtual object engagement, virtual environment actions, or any combination thereof. With the interactivity data, the collaboration platform can control movement of an avatar that is representative of the first participant in the virtual environment.

Upon acquiring these data, the collaboration platform can forward the stream of voice data to an API for real-time transcription by a transcription service (step 502). Contemporaneously, the collaboration platform can broadcast the stream of voice data to a second computing device, for presentation to a second participant in the conversation (step 503). The second computing device can be one of multiple computing devices to which the stream of voice data is broadcasted by the collaboration broadcast. The number of computing devices to which the stream of voice data is broadcasted generally corresponds to the number of participants, other than the first participant, who are involved in the conversation.

Thereafter, the collaboration platform can receive, from the transcription service, a textual stream that is produced for the stream of voice data (step 504). The collaboration platform can analyze the textual stream in conjunction with the stream of interactivity data, so as to establish an insight into the conversation (step 505). Examples of insights include questions, action items, summaries of extended speeches, and "a-ha" moments that are often parts of the transcript but said with greater emphasis or emotion, repeated, referred back to later in the conversation, or that result in greater group engagement.

Further, the collaboration platform can cause display of one or more indications of the insight in the virtual environment (step 506). In some embodiments, the collaboration platform causes display of the insight itself. For example, the collaboration platform can post, in the virtual environment, an action item derived through semantic analysis of the textual stream in combination with the interactivity data. In other embodiments, the collaboration platform causes display of a visual indicium of the insight. For example, the collaboration platform can post, in the virtual environment, a notification that indicates an insight was learned, though the insight may not be presented for review until the first participant indicates she is interested in review (e.g., by interacting with the visual indicium).

Other steps could also be performed.

For example, an intelligent agent could be used by the collaboration platform to facilitate conversation as discussed above. Therefore, the collaboration platform can cause display, in the virtual environment, of an avatar that is representative of the intelligent agent. As mentioned above, the intelligent agent can be generated or supported by an automated agent module that implements an artificial intelligence engine to facilitate the conversation based on an analysis of what is said by the participants. For example, the collaboration platform can obtain a question by providing the textual stream to the automated agent module as input, and then the collaboration can cause the question to be presented by the intelligent agent to at least one of the participants in the virtual environment. To identify the question, the automated agent module can employ an artificial intelligence engine that compares the textual stream to a guided narrative structure that is designed to ensure that certain information related to a given topic is acquired. At a high level, the guided narrative structure may be representative of a schema that can be employed by the artificial intelligence engine to guide conversation. The intelligent agent can verbally present the question in the virtual environment, or the intelligent agent can textually present the question in the virtual environment.

As another example, the collaboration platform can segment the textual stream into multiple segments. This can be accomplished in several ways. For example, the collaboration platform can segment the textual stream into multiple segments by statistically evaluating the textual stream using learnt statistical models associated with a set of phrases, so as to classify text therein using the learnt statistical models. Each statistical model can be learned through analysis of training data that includes examples of the corresponding phrase. From the training data, each statistical model is able to learn when use of the corresponding phrase is indicative of a topical shift. Alternatively, the collaboration platform can segment the textual stream into multiple segments based on a comparison of its words to (i) an agenda provided for the conversation, (ii) a template identified for the conversation, or (iii) a set of phrases indicative of a desire to delineate between different topics. This approach represents a more programmatic approach to identifying topical shifts, though success of this approach depends on having an accurate agenda, template, or set of phrases.

Regardless of how segmentation of the textual stream is performed, each of the multiple segments can be associated with a corresponding one of multiple topics. For each of the multiple segments, the collaboration platform can populate information derived from that segment into a first data structure, populate metadata associated with that segment into a second data structure, and link the first and second data structures together, so as to produce a graph data structure for the corresponding topic. Each graph data structure can be representative of a knowledge object. The collaboration platform can store the multiple graph data structures produced for the multiple topics in a graph database.

In some embodiments, attribution is an important aspect of ideation. Consider, for example, a scenario in which multiple participants are engaged in conversation regarding development of an important project. To ensure that each participant is appropriate acknowledged, the collaboration platform can document the contribution of each participant. For example, for each of the multiple segments, the collaboration platform can identify which of the participants contributed to the corresponding topic based on an analysis of that segment, compute a measure for each identified participant that is representative of an amount of contribution to the corresponding topic, and populate the computed measures for the identified participants in a data structure (e.g., the graph data structure created in accordance with the aforementioned process). Measures can be computed based on a statistical analysis of "speech time" of each participant. Each measure may be representative of a floating point number between zero and one. Generally, the measures are computed such that the measures computed for each of the multiple segments sum to one. Note that in some embodiments, the collaboration platform can filter the identified participants by comparing each measure against a threshold, such that identified participants who do not contribute at least a certain amount are not acknowledged for attribution purposes. Thus, the collaboration platform can determine, in a statistical manner, which participants only minimally participated in conversation regarding each topic.

Figure 6:
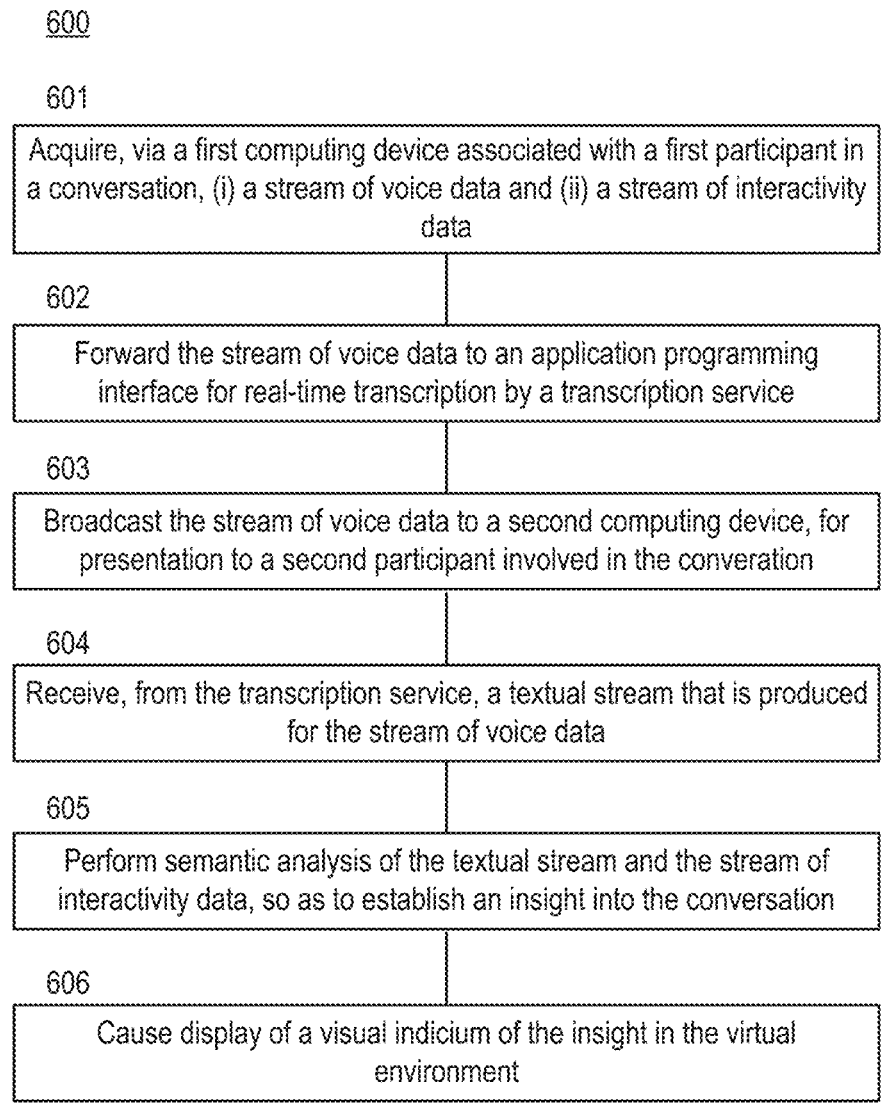
FIG. 6 depicts a flow diagram of another process for surfacing an insight into a conversation between participants who engage in a conversation in a virtual environment.

FIG. 6 depicts a flow diagram of another process 600 for surfacing an insight into a conversation between participants who engage in a conversation in a virtual environment. Initially, a collaboration platform can acquire, via a first computing device, (i) a stream of voice data that includes words spoken by a first participant as part of the conversation and (ii) a stream of interactivity data that includes a set of spatial interactions of the first participant with one or more attributes of the virtual environment (step 601). As mentioned above, the stream of interactivity data can specify engagement of the first participant with the first computing device (e.g., its buttons) and gestures performed by the first participant, as well as tone, sentiment, or volume of the first participant. Upon acquiring these data, the collaboration platform can forward the stream of voice data to an API for real-time transcription by a transcription service (step 602). Contemporaneously, the collaboration platform can broadcast the stream of voice data to a second computing device, for presentation to a second participant in the conversation (step 603). Thereafter, the collaboration platform can receive, from the transcription service, a textual stream that is produced for the stream of voice data (step 604). Steps 601-604 of FIG. 6 can be substantially similar to Steps 501-504 of FIG. 5.

Thereafter, the collaboration platform can perform semantic analysis of the textual stream and stream of interactivity data, so as to establish an insight into the conversation (step 605). As mentioned above, examples of insights include questions, action items, and summaries of extended speeches. Another example of an insight is a topical shift in conversation from a first topic to a second topic. As discussed above with reference to FIG. 4, the collaboration platform can identify topical shifts in several different ways. For example, the collaboration platform can employ a phrase recognizer (e.g., phrase recognizer 412 of FIG. 4) that compares the textual stream against a set of phrases, each of which is indicative of an interest in delineating between different topics, so as to identify a matching phrase that corresponds to the topical shift. As another example, the collaboration platform can infer that a topical shift has occurred based on an analysis of outputs produced by a semantic analyzer (e.g., semantic analyzer 410 of FIG. 4), either alone or in combination with the textual stream.

Moreover, the collaboration platform can cause display of a visual indicium of the insight in the virtual environment (step 606). For example, the collaboration platform can post, in the virtual environment, a notification that indicates an insight was learned, though the insight may not be presented for review until the first participant indicates she is interested in review (e.g., by interacting with the visual indicium). In some embodiments, the collaboration platform also causes display of at least some works included in the textual stream in the virtual environment. For example, the collaboration platform can post, in the virtual environment, the entire textual stream for review by the participants, or the collaboration platform can post, in the virtual environment, snippets of the textual stream. These snippets can indicate topical shifts, change in speaker, etc.

Methodologies for Documenting Virtual Conversations Via Knowledge Objects

Figure 7:
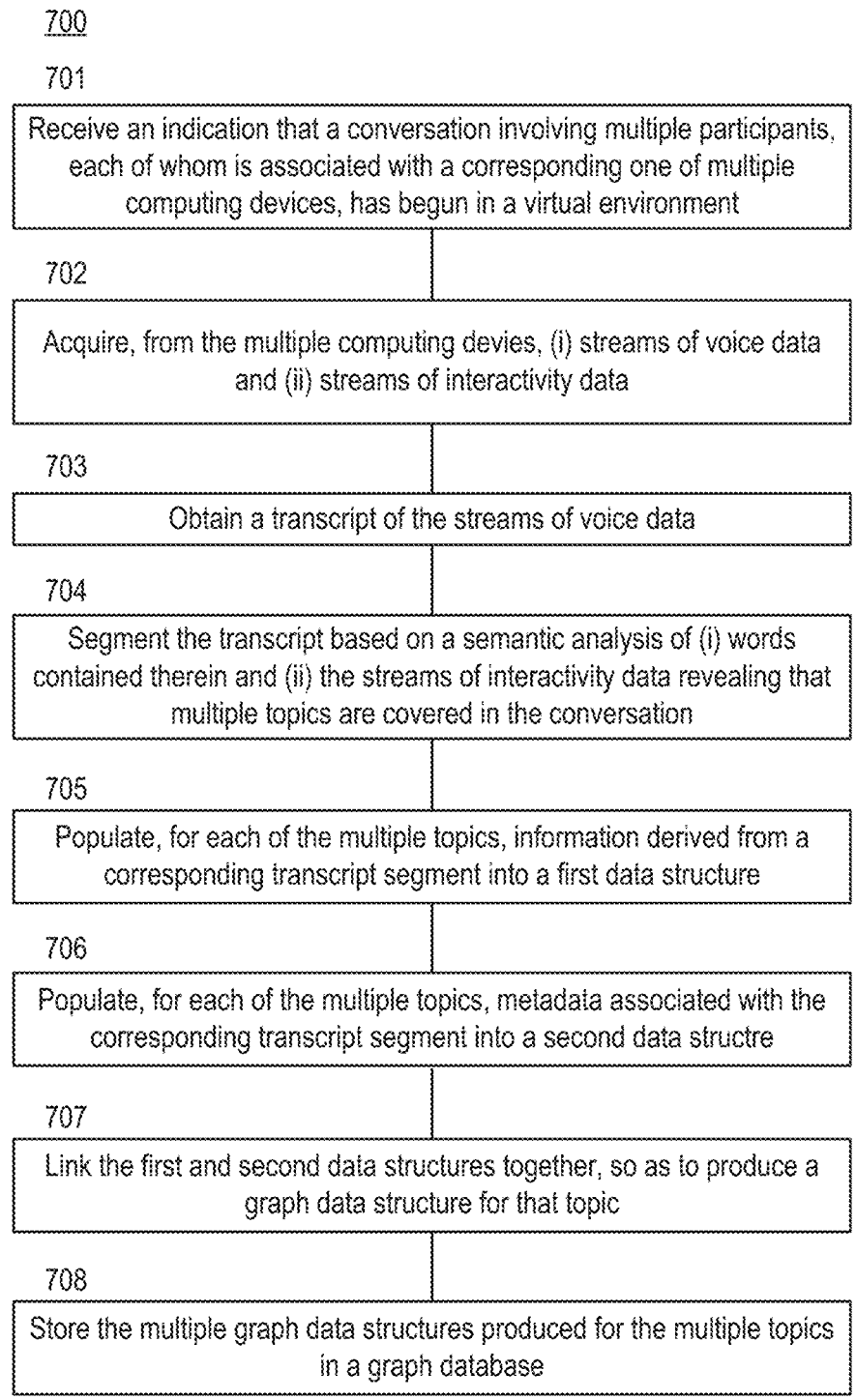
FIG. 7 includes a flow diagram of a process for documenting a conversation between participants in a virtual environment through the creation of data structures called "knowledge objects."

FIG. 7 includes a flow diagram of a process 700 for documenting a conversation between participants in a virtual environment through the creation of data structures called "knowledge objects." Initially, a collaboration platform can receive an indication that a conversation involving multiple participants, each of whom is associated with a corresponding one of multiple computing devices, has begun in a virtual environment (step 701). As discussed above, the collaboration platform may be responsible for creating, supporting, and managing the virtual environment in some embodiments. As such, the indication can be input indicating that each of the multiple participants has entered the virtual environment.

Thereafter, the collaboration platform can acquire, from the multiple computing devices, (i) streams of voice data that include words spoken by the multiple individuals as part of the conversation and (ii) streams of interactivity data that indicate spatial interactions of the multiple individuals with the virtual environment (step 702). Thus, the collaboration platform can receive a separate stream of voice data and a separate stream of interactivity data from each of the multiple computing devices. For each of the multiple participants, the corresponding stream of interactivity data can indicate the actual or desired spatial interactions of an avatar corresponding to that user with avatars associated with other participants in the conversation.

The collaboration platform can then obtain a transcript of the streams of voice data (step 703). In some embodiments, the collaboration platform includes a transcriber that is able to produce the transcript by performing a speech-to-text operation on each stream of voice data and then combining the resulting transcripts, so as to create a properly sequenced transcript. In other embodiments, transcription is "outsourced" to a service that is external to, but accessible to, the collaboration platform. For example, the collaboration platform can forward the streams of voice data to an API for real-time transcription by a transcription service that provides, as output, a properly sequenced transcript.

The collaboration platform can then segment the transcript based on a semantic analysis of (i) words contained therein and (ii) the streams of interactivity data revealing that multiple topics are covered in the conversation (step 704). For example, the collaboration platform can segment the textual stream into multiple segments by statistically evaluating the textual stream using learnt statistical models associated with a set of phrases, so as to classify text therein using the learnt statistical models. As another example, the collaboration platform can segment the textual stream into multiple segments based on a comparison of its words to (i) an agenda provided for the conversation, (ii) a template identified for the conversation, or (iii) a set of phrases indicative of a desire to delineate between different topics. Assume, for example, that the collaboration platform determines that the conversation has shifted from a first topic to a second topic by comparing the transcript to a template identified for the conversation. In response to such a determination, the collaboration platform can conclude the current transcript segment that corresponds to the first topic and commence the next transcript segment that corresponds to the second topic. Each of the multiple topics can be associated with a corresponding one of multiple transcript segments.

For each of the multiple topics, the collaboration platform can populate information derived from the corresponding transcript segment into a first data structure (step 705), populate metadata associated with the corresponding transcript segment into a second data structure (step 706), and link the first and second data structures together, so as to produce a graph data structure for that topic (step 707). The metadata can specify, for example, a date of the conversation, a time of the conversation, identifiers of the multiple participants who engaged in the conversation, locations of the multiple participants who engaged in the conversation, an agenda of the conversation, a document referenced in the conversation, or any combination thereof. As mentioned above, the metadata may only include identifiers for those participants that actually participated in a conversation segment that is associated with the corresponding transcript segment. The collaboration platform can store the multiple graph data structures—each of which is representative of the knowledge object produced for the corresponding topic—produced for the multiple topics in a graph database (step 708).

Regardless of how segmentation of the textual stream is performed, each of the multiple segments can be associated with a corresponding one of multiple topics. For each of the multiple segments, the collaboration platform can populate information derived from that segment into a first data structure, populate metadata associated with that segment into a second data structure, and link the first and second data structures together, so as to produce a graph data structure for the corresponding topic. Each graph data structure can be representative of a knowledge object.

Illustrative Examples of Virtual Environments

Figure 8A:
FIGS. 8A-D illustrate a virtual environment at different stages of an ideation session in which three topics are to be discussed.
Figure 8B:
Figure 8C:
Figure 8D:
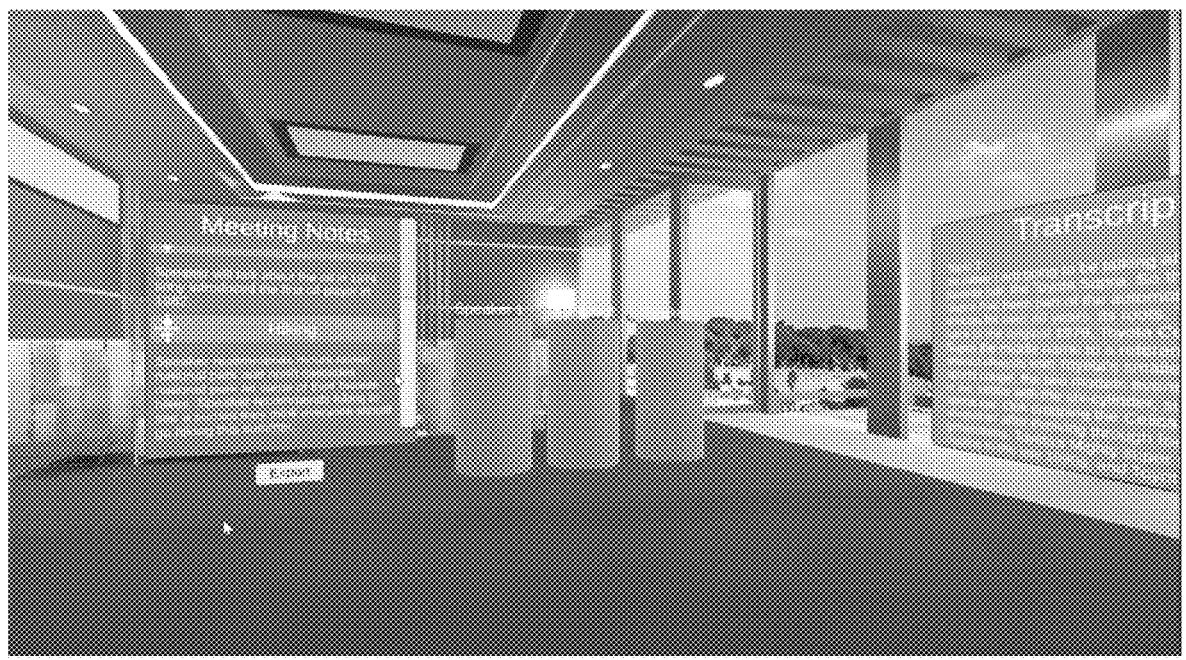

FIGS. 8A-D illustrate a virtual environment at different stages of an ideation session in which three topics are to be discussed. As shown in FIG. 8A, the virtual environment can initially include avatars for the participants, as well as an agenda that lists the topics to be discussed. As the speakers speak over the course of the conversation, the collaboration platform can obtain a transcript as discussed above. The transcript, or snippets thereof, may be posted for review as shown in FIG. 8B. Further, summaries of the topics can be posted for review. In FIG. 8B, a summary has been added beneath the first topic. This summary can be extracted, inferred, or otherwise derived from the transcript (and more specifically, the segment of the transcript that corresponds to the first topic). FIG. 8C illustrates how a summary can be added beneath the second topic to account for contribution by a second speaker, while FIG. 8D illustrates how a summary can be added beneath the third topic to account for contribution by a third speaker. As discussed above, these summaries can be output by a semantic analyzer (e.g., semantic analyzer 410 of FIG. 4).

In FIGS. 8A-D, the avatars of the participants are not designed to move about the virtual environment. However, the avatars can still be able to convey information regarding sentiment, engagement, focuses, interest, and the like. Measures for these characteristics can be computed by the collaboration platform or inferred by the collaboration platform based on information made available by the transcription service. Here, the avatars change color depending on the sentiment of the corresponding participant, as determined by the collaboration platform through analysis of interactivity data received from the corresponding computing device. As a specific example, the avatars can be rendered in a first color (e.g., green) to indicate that the participants are fully engaged or have positive sentiment toward the current topic of conversation, a second color (e.g., yellow) to indicate that the participants are partially engaged or have neutral sentiment toward the current topic of conversation, and a third color (e.g., red) to indicate that the participants are not engaged or have negative sentiment toward the current topic of conversation.

Figure 9:
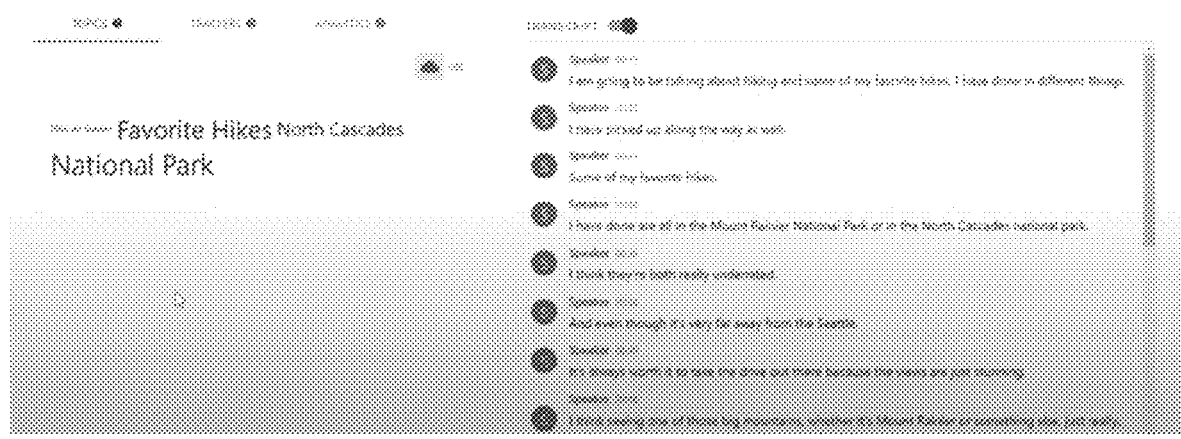
FIG. 9 illustrates an example of a transcript, as may be provided to the collaboration platform by a transcription service.

FIG. 9 illustrates an example of a transcript, as can be provided to the collaboration platform by a transcription service. As can be seen in FIG. 9, the transcription service can distinguish between different participants, allowing for improved knowledge of which participant contributed which concepts. Various analytics can also be output by the transcription service. As an example, topics can be identified based on a semantic analysis of the transcript. These topics may be representative of insights into the conversation, and therefore can be posted in the virtual environment for review by the participants, such that the participants can readily determine which topics have been discussed.

Illustrative Examples of Ideation Capabilities of Collaboration Platform

Several examples of the capabilities of the collaboration platform are provided below. These examples are provided for the purpose of illustration, and therefore are not intended to limit the present disclosure.

A. Ideation Scenario Involving Individual Creativity

Alice has been thinking about writing a book for several years. She knows what she would like to write about, but every time she attempts to formalize that concept, the ideas are jumbled and inconsistent. Alice has spoken to Betty, who knows how the publishing industry works, and Betty suggested that they start by brainstorming ideas in order to develop a writing plan for Alice. Alice and Betty decide to use the collaboration platform to more coherently organize her ideas.

Alice equips her VR device and, through an interface generated by the collaboration platform, enters a virtual environment configured with a whiteboard, browser viewer, and digital features that are intended to provoke deeper thought. These digital features may simply be visual (e.g., taking the form of scenes or paintings). Shortly after Alice enters the virtual environment, Luna, an intelligent agent, enters the virtual environment. Alice asks Luna for help with brainstorming simply language that keys into voice commands that Luna understands. Luna switches into a mode where her behavior is largely driven by a conversational robotic intelligence (also called a "conversational bot") that asks open-ended questions intended to stimulate creativity. Luna begins by asking Alice to tell her what she would like to brainstorm. As Alice gives her answer, Luna analyzes a textual representative of the answer, looking for patterns and words that can then be used to generate new questions. For example, if Alice says that she would like help thinking about the history of Chinese food, Luna can ask subject-driven questions such as "What aspects of the history are you interested in," "What time period do you want to start with," or "How important are noodles to your thesis."

As the conversation proceeds, Alice and Luna can create representations in the virtual environment of the ideas that Alice has had. When Alice creates representations herself, those representations may immediately appear wherever one is placed. When Luna creates representations, those representations can be presented for review by Alice, who can opt to adopt those representations is she so chooses. During the conversation, Luna can also create connections between the ideas by linking relevant segments of the transcript for later reference. Alice can also create these connections herself by indicating—verbally or otherwise—that two ideas are related. For example, Alice can use set commands to direct Luna to connect two ideas. As a specific example, Alice can say, "Maybe I should talk about the different roles of spices in Hunan and Szechuan cuisine—Luna, can you add me a to-do to research that question and connect it to those concepts."

Thereafter, Alice realizes that she must terminate the ideation session due to another meeting. Alice asks Luna to save the ideation session and reserve another timeslot on her calendar for several days later so that brainstorming can continue. Alice can also ask Luna to communicate any action items and questions resulting from the ideation session, so that she can continue working as time perm its.

B. Ideation Scenario Involving Group Creativity

Bob and Boris are old friends that reconnect at a wedding of a mutual friend. Over conversation, they come up with an idea for a business that they would like to discuss further. Since Boris is scheduled to return home shortly after the wedding, they decide to use the collaboration platform to develop a business model canvas together.

At some point thereafter, Bob and Boris enter a virtual environment supported by the collaboration platform. Bob enters the virtual environment by equipping a VR device, while Boris enters the virtual environment using his laptop computer. They begin the ideation session by chatting while jointly performing an activity (e.g., throwing a ball or playing a game) in an open conversation space. Then, they enter a conference room that is configured with a business model canvas, a browser window, and an open area in which a thought analysis tool—offered or supported by the collaboration platform—locates outputs. When they are ready to start, Luna is summoned with a voice command, with either Bob or Boris telling Luna that they would like assistance in running a business model canvas session.

Bob and Boris begin the ideation session by brainstorming key partners. Luna listens to their dialogue and suggests cards for the business model canvas based on an analysis of what is said. In addition, Bob can occasionally direct Luna to add, remove, or adjust cards. After ten minutes, the conversation begins to wander as Boris begins talking about the political complexities involved in working with municipal organizations on projects like the one being discussed. Luna determines that there has been a topical shift and suggests that if they were done discussing partners, perhaps they should move onto the next cell in the business model canvas. As cards are subsequently added to cells in the business model canvas, Luna can occasionally detect that a new card refers to an existing card in an earlier cell. In such a scenario, Luna can propose creating a linkage between the new and existing cards. As discussed above, Luna can associate relevant snippets of audio and transcript with each card.

By the time they get to the value proposition cell, Bob and Boris feel tied and decide to ask Luna for assistance. She suggests that they take a five-minute break to perform some activity (e.g., throw a ball or play a game) in the virtual environment. Inevitably, the conversation turns back to business. Luna continues to listen throughout and, when Bob and Boris return to the workspace, Luna presents a list of concepts that were informally discussed but might be worth further exploration. Bob and Boris select several of these concepts to add to the business model canvas as new cards.

Having taken a break, Bob and Boris feel revitalized but still struggle to generate cards for the value proposition cell. Turning again to Luna for help, Luna suggests that they might want to try a brainstorming activity, such as de Bono's thinking hats. Bob approves and asks Luna to facilitate the brainstorming activity. Upon starting the brainstorming activity, six hats appear in the virtual environment. Bob begins the brainstorming activity by interacting with the green hat (e.g., by grabbing or equipping the green hat). Other digital elements in the virtual environment can be changed to reflect his choice, and Luna reminds them that the green hat indicates its "wearer" is responsible for generating ideas without criticism or assessment. Bob and Boris begin offering ideas as before, but this time the ideas are collected as knowledge objects floating in space in the virtual environment. If Bob offers criticism of an idea suggested by Boris, or vice versa, Luna can notice and interject, reminding them that criticism can be offered while "wearing" the black hat rather than the green hat.

Bob and Boris continue working on the business model canvas for another hour until Bob needs to leave. After he leaves, Boris asks Luna to save the virtual environment, business model canvas, knowledge objects, and current position in the ideation session. Several days later, Bob and Boris reunite in the virtual environment and complete the ideation session. Satisfied with the completed business model, Bob asks Luna to export the canvas, related ideas, and linked knowledge objects into one or more files that can be subsequently consulted. Bob also asks Lunda to save the topic cloud that is produced by the collaboration platform over the course of the ideation session, so that Bob and Boris can bring up the topic cloud in subsequent conversations.

C. Review and Use of Topic Cloud

Charles is an urban planner who has used the collaboration platform for an extended period of time, both as a tool to help with facilitating individual creativity but also as a tool to support envisioning exercises and other group creativity activities that he uses as part of his practice. Charles recently completed such an activity with a group of community stakeholders for a small park that he is managing the renovation and re-invention of. Having gathered ideas from these stakeholders, Charles next task is to integrate this feedback with information gathered in other sessions (e.g., meetings with the mayor, other groups of community stakeholders, etc.), as well as his own ideas. Charles knows that in the future, he will need to present these ideas in a report to the town council for approval and funding.

Charles starts by entering a virtual environment and then reviewing the topic cloud produced by the collaboration platform based on previous ideation sessions in the virtual environment. This topic cloud can include a network of notes, ideas, and references to source material such as interview responses, images of potential sites, and design specifications, all linked to one another by relationships such as "supported by," "suggests," "alternative to," and more. This topic cloud may have been created for Charles over the course of many ideation sessions with some connections and notes entered by Charles himself, with other connections and notes being suggested by Luna.

After entering the virtual environment, Charles immerses himself in the network of the topic cloud, following links as interest and inspiration hit him. He adds several annotations to existing items, but he is mostly focused on refamiliarizing himself with the material that has already been gathered. After he has done this for a while, Charles loads the topic cloud and knowledge objects created during his most recent ideation session. Luna makes suggestions about how certain topics might be connected to one another, mostly by looking for related terms and reviewing similarity metrics, but Charles can perform most of the work, establishing connections and asking Luna to help him manage what he is observing so that he does not get too overwhelmed.

After working for a while, Charles is satisfied that the material gathered at his most recent ideation session is well-integrated with the existing material, and he is ready to start working on the report. Charles removes his VR device and sits down at his laptop computer, where he navigates to the collaboration platform and loads the topic cloud. For example, Charles can initiate a desktop application that executes on the laptop computer, or Charles can initiate a web browser and then navigate to a web address associated with the collaboration platform. Because he is viewing the topic cloud in a two-dimensional ("2D") format, it may not be possible to show the full topic cloud without becoming overwhelming. Generally, the full topic cloud has a graph structure, where relationships between different concepts—which are displayed as nodes—are illuminated using lines connected therebetween. Charles can use search and filter tools—offered or supported by the collaboration platform—to extract relevant portions of the topic cloud for review. These relevant portions can be presented in either a 2D graph view or hierarchical text view, depending on which interface he is using. To produce the report, Charles runs a series of queries across the topic cloud to draw out important lists of suggestions and ideas, which he then pastes into a word processor. Charles then moves onto translating these suggestions into workable prose, maintaining where appropriate the identifiers and references of certain ideas so that he can refer back to the topic cloud later. As he writes, Charles identifies a few more queries to run, which he does using a desktop application, web browser, or inline plug-in that allows him to run queries by selecting text within his document and selecting from among proposed options. After several hours of writing, Charles finishes the report and sends it to his colleagues for review.

D. Creating and Documenting Context

Doris is a marketing specialist who is working on a new campaign for a line of shoes and accessories with her colleagues Dave and Deborah. Together, they work iteratively through a cycle of concept development, individual ideation and writing, and review. During this process, Doris regularly generates new ideas in response to comments and suggestions made by David and Deborah, which she writes down as notes for later development. Unfortunately, by the time she reviews these notes, the sense of inspiration and the potential and rationale associated with the ideas has often faded, leaving her unable to make full use of it.

Following the advice of coworkers, Doris, Dave, and Deborah opt to use the collaboration platform for their next session. During that session, Doris has several ideas about how the narrative of the campaign might be usefully reframed. With support from Luna, Doris creates a knowledge object for each idea. In addition to linking the ideas to other elements of the conversation, Luna also collects information about the context within which each idea occurred, including a snippet of transcript before and after the time at which the idea was created, spatial and environmental information that may help remind Doris of where she was when the idea occurred, and various other metadata.

A week later, Doris sits down to further develop her ideas in an individual ideation session. She enters the virtual environment supported by the collaboration platform and reviews the knowledge objects corresponding to her ideas from the previous ideation session. Picking the first item and reading the note itself, Doris is unable to remember why she thought it was so important at the time. She triggers the platform's "context mode" and is transferred into the virtual environment corresponding to the context in which this knowledge object was created. The relative position of her avatar, characteristics of the virtual environment, and behavior of avatars corresponding to Dave and Deborah are recreated, and Doris is able to review the ideation session in the hope of understanding the idea more fully and regaining her inspiration. After a few moments, inspiration strikes again, and she returns to her individual ideation space to flesh out the idea.

Months later, Doris is reviewing the knowledge objects she captured during an ideation session with a different team on a different project. She realizes that she thought about this idea before and wishes she could remember where. She is able to remember that it was part of a conversation that she had with Dave and Deborah in which they were talking about website search engine optimization ("SEO"). She calls up Luna and provides this information to execute a search. Luna can search through Doris' notes using the associated metadata to find the time when this idea was initially discussed. Doris pulls up the context replay and relistens to that conversation. She then remembers what Deborah was describing, and she is able to repurpose that idea on her current project. Later, Doris calls on Deborah and asks her to give feedback on this new implementation of the idea.

Processing System

Figure 10:
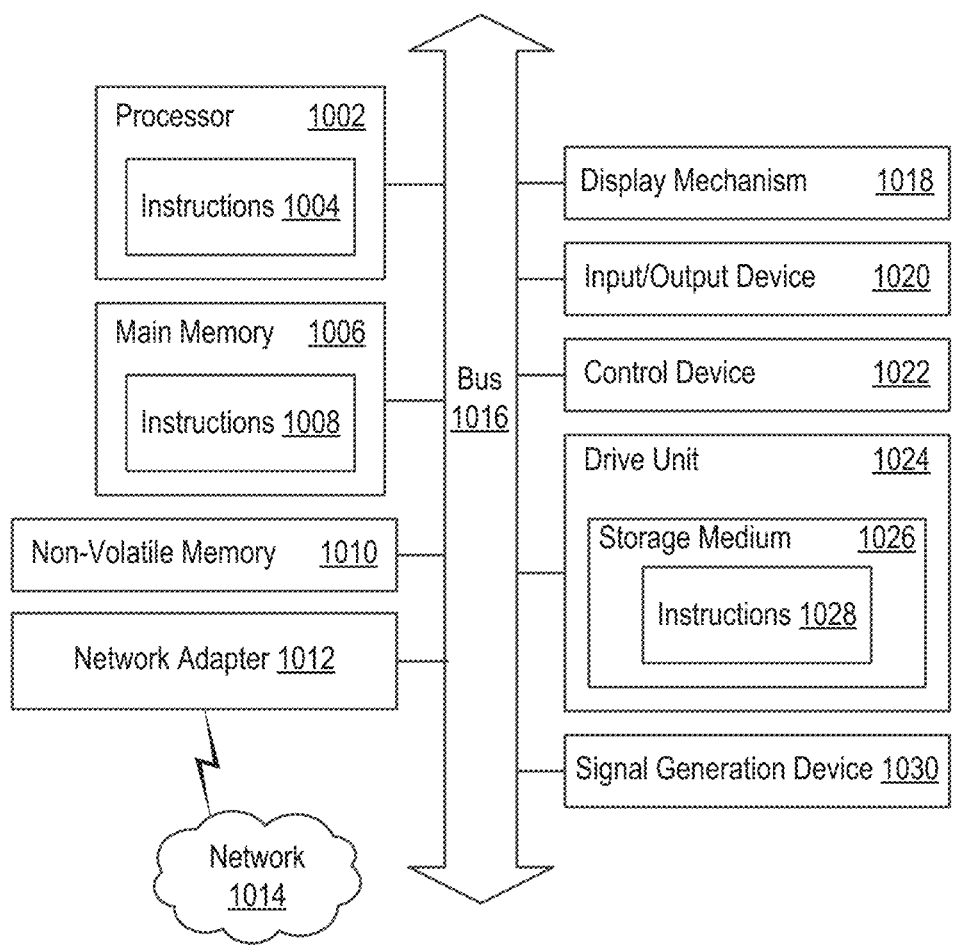
FIG. 10 is a block diagram illustrating an example of a processing system in which at least some operations described herein can be implemented.

FIG. 10 is a block diagram illustrating an example of a processing system 1000 in which at least some operations described herein can be implemented. For example, components of the processing system 1000 can be hosted on a computing device that includes a collaboration platform, or components of the processing system 1000 can be hosted on a computing device that is used to access a virtual environment that is generated by the collaboration platform.

The processing system 1000 can include a processor 1002, main memory 1006, non-volatile memory 1010, network adapter 1012, video display 1018, input/output devices 1020, control device 1022 (e.g., a keyboard or pointing device such as a computer mouse or trackpad), drive unit 1024 including a storage medium 1026, and signal generation device 1030 that are communicatively connected to a bus 1016. The bus 1016 is illustrated as an abstraction that represents one or more physical buses or point-to-point connections that are connected by appropriate bridges, adapters, or controllers. The bus 1016, therefore, can include a system bus, a Peripheral Component Interconnect ("PCI") bus or PCI-Express bus, a HyperTransport ("HT") bus, an Industry Standard Architecture ("ISA") bus, a Small Computer System Interface ("SCSI") bus, a Universal Serial Bus ("USB") data interface, an Inter-Integrated Circuit ("I²C") bus, or a high-performance serial bus developed in accordance with Institute of Electrical and Electronics Engineers ("IEEE") 1394.

While the main memory 1006, non-volatile memory 1010, and storage medium 1026 are shown to be a single medium, the terms "machine-readable medium" and "storage medium" should be taken to include a single medium or multiple media (e.g., a centralized/distributed database and/or associated caches and servers) that store one or more sets of instructions 1028. The terms "machine-readable medium" and "storage medium" shall also be taken to include any medium that is capable of storing, encoding, or carrying a set of instructions for execution by the processing system 1000.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computing device. When read and executed by the processors 1002, the instruction(s) cause the processing system 1000 to perform operations to execute elements involving the various aspects of the present disclosure.

Further examples of machine- and computer-readable media include recordable-type media, such as volatile memory devices and non-volatile memory devices 1010, removable disks, hard disk drives, and optical disks (e.g., Compact Disk Read-Only Memory ("CD-ROMs") and Digital Versatile Disks ("DVDs")), and transmission-type media, such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, a repeater, or any combination thereof.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments can vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for surfacing an insight into a conversation between users of virtual reality devices who engage in the conversation in a virtual environment, the method comprising:

acquiring, via a first virtual reality device,
(i) a stream of voice data that includes words spoken by a first user as part of the conversation, and
(ii) a stream of interactivity data that includes a set of spatial interactions of the first user with one or more attributes of the virtual environment;

in response to said acquiring,
forwarding the stream of voice data to an application programming interface for real-time transcription by a transcription service, and broadcasting the stream of voice data to a second virtual reality device, for presentation to a second user involved in the conversation;

receiving, from the transcription service, a textual stream that is produced for the stream of voice data;

segmenting the textual stream into multiple segments based on a comparison of its words to (i) an agenda provided for the conversation, (ii) a template identified for the conversation, or (iii) a set of phrases indicative of a desire to delineate between different topics;

associating each of the multiple segments with a corresponding one of multiple topics;

for each of the multiple segments,
populating information derived from that segment into a first data structure,
populating metadata associated with that segment into a second data structure, and
linking the first and second data structures together, so as to produce a graph data structure for a corresponding topic;

storing the multiple graph data structures produced for the multiple topics in a graph database;

analyzing the multiple segments of the textual stream in conjunction with the stream of interactivity data, so as to establish the insight into the conversation; and causing display of one or more indications of the insight in the virtual environment.

2. The method of claim 1, wherein the stream of interactivity data is used to control a pose of an avatar that is representative of a virtual representation of the first user in the virtual environment.

3. The method of claim 2, wherein the stream of interactivity data is representative of a temporal series of values for avatar head pose, avatar left hand pose, avatar right hand pose, avatar gaze angle, avatar object engagement, avatar actions, or any combination thereof.

4. The method of claim 1, further comprising:
causing display of an avatar in the virtual environment, wherein the avatar is representative of an automated agent module that implements an artificial intelligence engine to facilitate the conversation.

5. The method of claim 4, further comprising:
obtaining a question by providing the textual stream to the automated agent module as input; and
causing the question to be presented to at least one of the users in the virtual environment.

6. The method of claim 5, wherein the question is represented in the virtual environment with textual content.

7. The method of claim 5, wherein to identify the question, the automated agent module employs an artificial intelligence engine that compares the textual stream to a guided narrative structure designed to ensure that certain information related to a given topic is acquired.

8. The method of claim 1, wherein the textual stream is segmented into the multiple segments by statistically evaluating the textual stream using learnt statistical models associated with different phrases, so as to classify text therein using the learnt statistical models.

9. The method of claim 1, further comprising:
for each of the multiple segments,
identifying which of the users contributed to the corresponding topic based on an analysis of that segment,
computing a measure for each identified user that is representative of an amount of contribution to the corresponding topic, and
populating the measures for the identified users in the graph data structure.

10. The method of claim 9, wherein each measure is representative of a floating point number between zero and one.

11. The method of claim 10, wherein measures computed for each of the multiple segments sum to one.

12. The method of claim 9, further comprising:
filtering the identified users by comparing each measure against a threshold, such that identified users who do not contribute at least a certain amount are not acknowledged for attribution purposes.

13. A method comprising:
receiving an indication that a conversation involving multiple individuals, each of which is associated with a corresponding one of multiple computing devices, has begun in a virtual environment;

acquiring, from the multiple computing devices,
(i) streams of voice data that includes words spoken by the multiple individuals as part of the conversation, and
(ii) streams of interactivity data that indicate spatial interactions of the multiple individuals with the virtual environment;

obtaining a transcript of the streams of voice data;

segmenting the transcript based on a semantic analysis of (i) words contained therein and (ii) the streams of interactivity data revealing that multiple topics are covered in the conversation,
wherein each of the multiple topics is associated with a corresponding one of multiple transcript segments;

for each of the multiple topics,
populating information derived from the corresponding transcript segment into a first data structure,
populating metadata associated with the corresponding transcript segment into a second data structure, and
linking the first and second data structures together, so as to produce a graph data structure for that topic; and storing the multiple graph data structures produced for the multiple topics in a graph database.

14. The method of claim 13, wherein for each of the multiple individuals, the corresponding stream of interactivity data indicates the spatial interactions of an avatar corresponding to that user with avatars associated with other users in the virtual environment.

15. The method of claim 13, wherein said segmenting comprises:
determining that the conversation has shifted from a first topic to a second topic by comparing the transcript to a template identified for the conversation, and
in response to said determining,
concluding a current transcript segment that corresponds to the first topic, and
commencing a next transcript segment that corresponds to the second topic.

16. The method of claim 13, wherein the metadata specifies a date of the conversation, a time of the conversation, identifiers of the multiple individuals that participated in the conversation, locations of the multiple individuals that participated in the conversation, an agenda of the conversation, a document referenced in the conversation, or any combination thereof.

17. The method of claim 13, wherein the metadata includes identifiers for those individuals of the multiple individuals that participated in a conversation segment corresponding to that transcript segment.

18. The method of claim 13, wherein the metadata includes identifiers for the multiple individuals participating in the conversation, geographical locations of the multiple individuals, and local times of the multiple individuals.

* * * * *